United States Patent [19]

Carlstedt et al.

[11] Patent Number: 4,876,598

[45] Date of Patent: Oct. 24, 1989

[54] APPARATUS FOR DIGITIZING A COMPOSITE VIDEO SIGNAL

[75] Inventors: Kenneth T. Carlstedt, Seattle; Richard S. Penn, Issaquah, both of Wash.

[73] Assignee: Tecon, Inc., Redmond, Wash.

[21] Appl. No.: 196,386

[22] Filed: May 20, 1988

[51] Int. Cl.⁴ .............................................. H04N 5/14
[52] U.S. Cl. ..................................... 358/160; 358/903
[58] Field of Search ............... 358/21 R, 22, 148, 160, 358/280, 903

[56] References Cited

U.S. PATENT DOCUMENTS

| | | | |
|---|---|---|---|
| 4,193,119 | 3/1980 | Arase et al. | 364/900 |
| 4,352,165 | 9/1982 | Hevenor, Jr. | 364/900 |
| 4,417,276 | 11/1983 | Bennett et al. | 358/160 |
| 4,419,740 | 12/1983 | Hevenor, Jr. | 364/900 |
| 4,449,199 | 5/1984 | Daigle | 364/900 |
| 4,513,390 | 4/1985 | Walter et al. | 364/900 |
| 4,589,020 | 5/1986 | Akatsuka | 358/160 |
| 4,754,331 | 6/1988 | Wojcik et al. | 358/160 |
| 4,811,407 | 3/1989 | Blokker, Jr. et al. | 358/903 |

Primary Examiner—Edward L. Coles, Sr.
Assistant Examiner—Michael D. Parker
Attorney, Agent, or Firm—Seed and Berry

[57] ABSTRACT

A digitizer board is disclosed of the type which can be coupled to the data bus of a standard personal computer to enhance the data processing capabilities of the computer. The digitizer board is adapted to receive a composite video signal input which includes information for reproducing an image, e.g., television images. The composite video signal also includes a composite synchronization signal which carries information for synchronizing reproduction of the image from the composite video signal. The digitizer board responds to the composite video signal to digitize the image signals such that the digitized image signals may be readily stored, transmitted or reproduced using standard digital data processing apparatus.

17 Claims, 7 Drawing Sheets

APPARATUS FOR DIGITIZING A COMPOSITE VIDEO SIGNAL

DESCRIPTION

1. Technical Field

The present invention is directed toward digital storage of image information and, more particularly, toward apparatus for digitizing a composite video signal and for storing the digitized signal data in the memory of a standard personal computer.

2. Background of the Invention

With the advancement of digital technology including digital data storage and data processing, the industry continues to develop more applications for the improving technology. Many such new applications rely upon digital storage of information because information so stored can be quickly and readily retrieved, communicated and/or processed.

One area which has received industry interest has been digital storage of images. More particularly, it is desirable to provide apparatus which is capable of digitizing a composite video signal, such as, for example, those used in television communications, so that the digitally stored images may be communicated, processed or stored.

Prior attempts to digitize analog, composite video signals have not been successful for several, reasons. Primarily, digitization of a composite video signal requires a local clock for sampling the incoming video signal to provide the discrete digital data values. The incoming video signal includes a horizontal synchronization signal which indicates the beginning of each line of the image. Intermediate each horizontal synchronization signal is a continuous, analog image signal which is to be sampled by the digitizer to provide a plurality of discrete digital values, each digital value being referred to herein as a pixel. It is important, however, that the digitizer take samples of the analog image signal at precisely the same time, relative to each horizontal synchronization signal. If the samples are not taken at precisely the same time, then the digitizer will be unable to correctly vertically align corresponding pixels of the subsequent lines of the image and, therefore, an image having a vertical straight line will appear as a fuzzy or jagged line when the image is reproduced from the digital data values. Accordingly, the local clock of the digitizer must be in phase with each other line in the image, relative to the horizontal synchronizaton signal to produce a good image.

Several prior attempts to provide a local clock for digitizing analog image signals relied upon a constant oscillator, such as a crystal oscillator, which is gated using the horizontal synchronization signal. These methods have proven unacceptable because the horizontal synchronization signal for every line does not occur at the same point in the cycle of clock pulses of the constant oscillator. Accordingly, the clock pulses of the constant oscillator used for one line of the image are out of phase with the clock pulses for the other lines. Although the constant clock rate may be multiplied prior to gating, and divided after gating, the result is only a division of the error and not a substantial elimination of the error.

Other attempts to provide a local clock have incorporated a phase locked loop circuit to lock to the horizontal synchronization signal. While these methods provide a clock signal which occurs at the same time relative to the horizontal synchronization signal, the time which it takes the phase locked loop circuit is too long for certain applications and substantial portions of the image signal are not digitized. Still other methods rely upon software correction of the image. These methods are extremely complicated, time-consuming and expensive.

For these reason, prior attempts to digitize composite video signals have resulted in digital reproductions of the image wherein vertically oriented lines are fuzzy, and the image is generally not clear.

In addition to providing a sample clock which samples the analog video signal at the same time from line-to-line, relative to the horizontal synchronization signal, it is also necessary to provide a digitizer with apparatus for distinguishing between even and odd fields in the case of an interlaced composite video signal. Many video applications, such as, for example, television, use this type of video signal. In these applications, the composite video signal will first provide an even field for reproduction on the television screen (or other cathode ray tube), which even field will only write even lines of the viewing screen. The next succeeding field provided by the composite video signal will be an odd field, which odd field will only write odd lines of the viewing screen. Accordingly, it requires two fields of video signals, which fields must be properly assembled, to write an entire screen or frame, as stated in the art.

In television applications, this method is advantageous in that the phosphorus from the even field of video signals is still energized at the time when the odd field is written. This requires, however, that in digital applications the digitizer distinguish between even and odd fields and assemble the digitized data properly. Further, it becomes more important to provide a clock which occurs at the same time during each line when the digitizer is receiving an interlaced composite video signal. This is because the time which occurs from writing the first line until the second line is written is many times longer with interlaced video than with non-interlaced video and, accordingly, any drift which occurs will have much more negative effect on the resultant image.

Accordingly, it is desirable to provide apparatus for digitizing a composite video signal which includes a clock whose phase is the same during each line, i.e., is in synchronization from line-to-line, relative to the horizontal synchronization signal. It is also desirable to provide apparatus for digitizing a composite video signal which includes means for distinguishing between even and odd fields of interlaced video. It is lastly desirable to provide such apparatus for digitizing a composite video signal which provides a clear picture and is relatively inexpensive.

Disclosure of the Invention

The present invention provides apparatus which is coupleable to a standard personal computer for digitizing composite video signals of the type which include an analog image signal that carries information for reproducing an image on a cathode ray tube. The composite video signal also includes a composite synchronization signal which comprises a horizontal synchronization signal for synchronizing the digitizing apparatus and for controlling the decoding of the image signals to produce the image.

The apparatus includes an interface portion for interfacing the digitizing apparatus with the standard personal computer. The interface portion includes data registers for storing control data received from the standard personal computer. The digitizing apparatus also includes a control portion for recovering the composite synchronization signal from the composite video signal. The control portion is responsive to the composite synchronization signal and the control data for initiating the digitization of the incoming composite video signal.

To insure that a clear picture can be reproduced, the digitizing apparatus includes a startable sample clock for periodically generating a plurality of clock pulses. The sample clock is responsive to the horizontal synchronization signal to start generating the clock pulses The digitizer apparatus also includes a data converter portion which is responsive to the clock pulses provided by the sample clock for converting the analog image signals to digital data values. The converter portion is coupled to the interface portion for transferring the digital data values thereto.

BEST MODE FOR CARRYING OUT THE INVENTION

Figure 1:
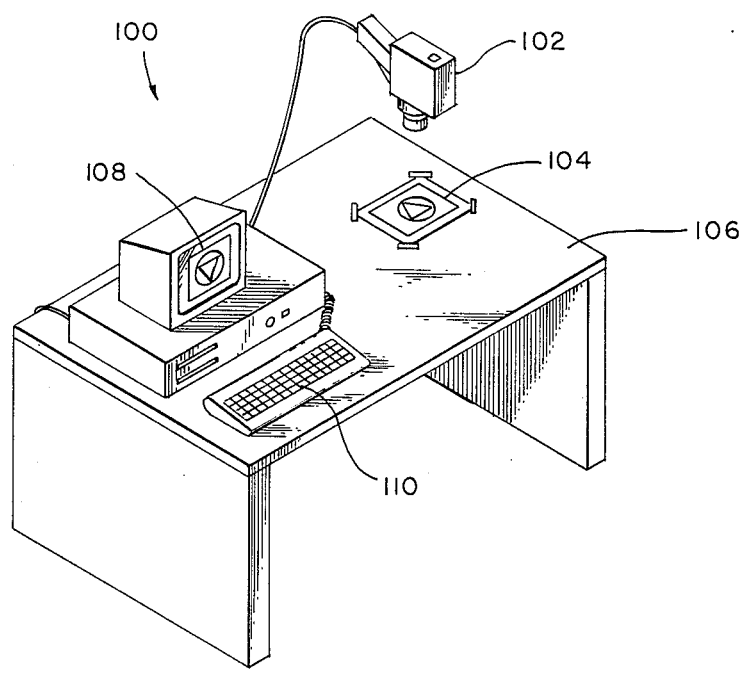
FIG. 1 is an illustration of a conventional personal computer utilizing the digitizer apparatus of the present invention shown coupled to a standard video camera for receiving a composite video signal to be digitized.

An apparatus to which the present invention is directed is illustrated generally in FIG. 1. A general purpose, personal computer 100 is coupled to a standard video camera 102 for receiving composite video signals 298 (FIG. 3) therefrom. The composite video signals provided from the camera 102 contain analog image signals that represent an object 104, such as a photograph, map, fingerprint card or three-dimensional object, which may be located on a horizontal resting surface 106 which may comprise part of the table on which the personal computers and camera are supported. The composite video signals which are provided from the camera 102 are of the variety which are shown generally in waveform (a) of FIG. 3.

Figure 3:
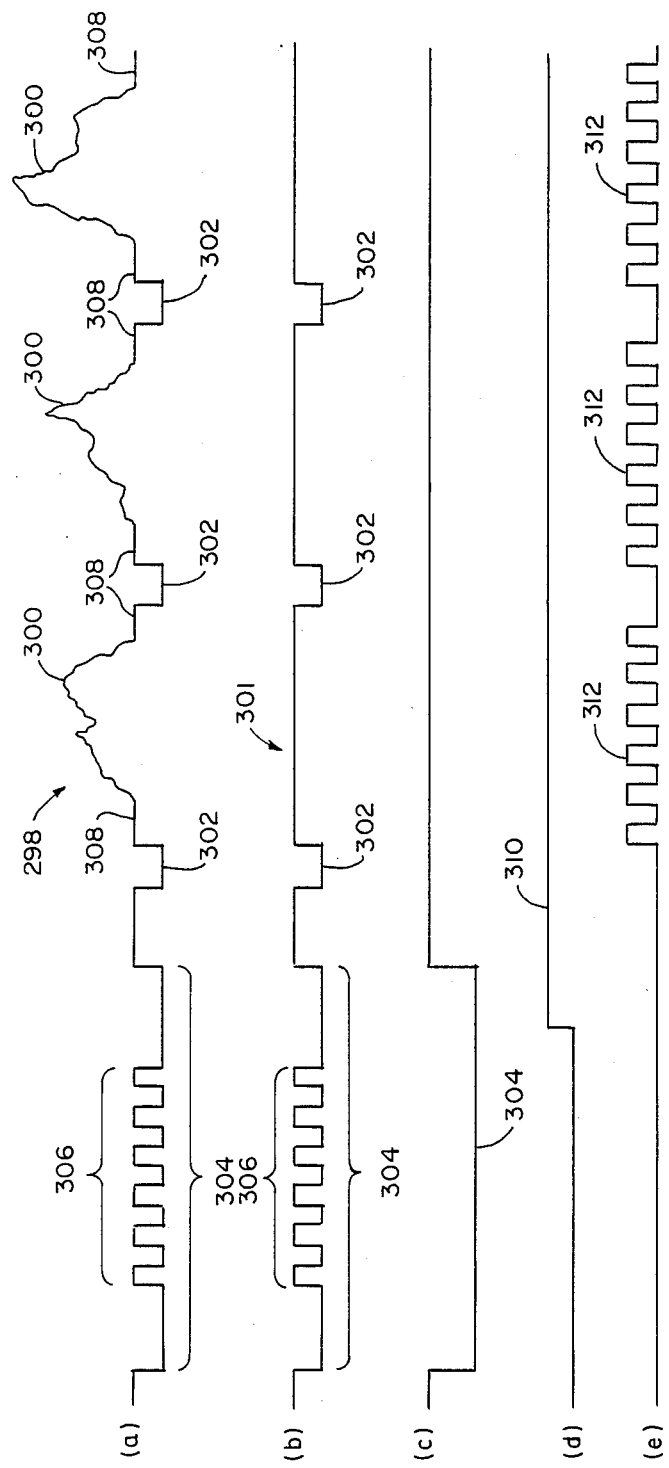
FIG. 3 contains a plurality of signal voltage versus time graphs which illustrate the relationship between various signals that control the digitization of the composite video signal.

The composite video signal 298 includes a plurality of analog image signal portions 300 that carry information in conventional format for reproducing a corresponding image on a cathode ray tube (CRT) (not show). The composite video signal also includes a plurality of horizontal synchronization signal pulses 302 which indicate the beginning and end of a line of the image. As shown in FIG. 3, the horizontal synchronization signal pulses 302 precede each analog image signal portion 300 and thereby indicate that the analog image signal portion following the pulse represents a line of the image. The composite video signal also includes a vertical synchronization signal pulse 304 which indicates the beginning and end of a field of the image. The vertical synchronization signal pulse includes a plurality of superimposed shorter duration equalization pulses 306 for synchronizing the video signal receiver with the incoming composite video signal.

Generally, composite video signals may be either interlaced or non-interlaced. When the composite video signals are interlaced, then a field of the image includes in alternating groups either odd lines or even lines of the image. Two successive fields would include one set of odd lines and one set of even lines of the image. Accordingly, for interlaced video, it is necessary to receive at least two fields in order to receive every line of the image.

The personal computer 100 may include a display 108 and a keyboard 110 for interfacing a user with the personal computer 100. Further, as is known in the art, the personal computer 100 may include a data processor (not shown) which communicates with a data bus (not shown) to control the operation of the personal computer including the operation of the display 108 and the keyboard 110. Also, the personal computer includes apparatus for receiving additional data processing boards and coupling the boards to the data bus thereof such that the data processor of the personal computer 100 may interact with the additional boards to further enhance the capabilities of the personal computer.

The present invention comprises apparatus which may be mounted upon such an additional board, referred to herein as a digitizer board 112, and added to the personal computer 100 to enable the personal computer to digitize the composite video signal 298 received from the camera 102. An illustrative block diagram of the circuitry of the digitizer board 112 which is the subject of the present invention is illustrated in FIG. 2.

Figure 2:
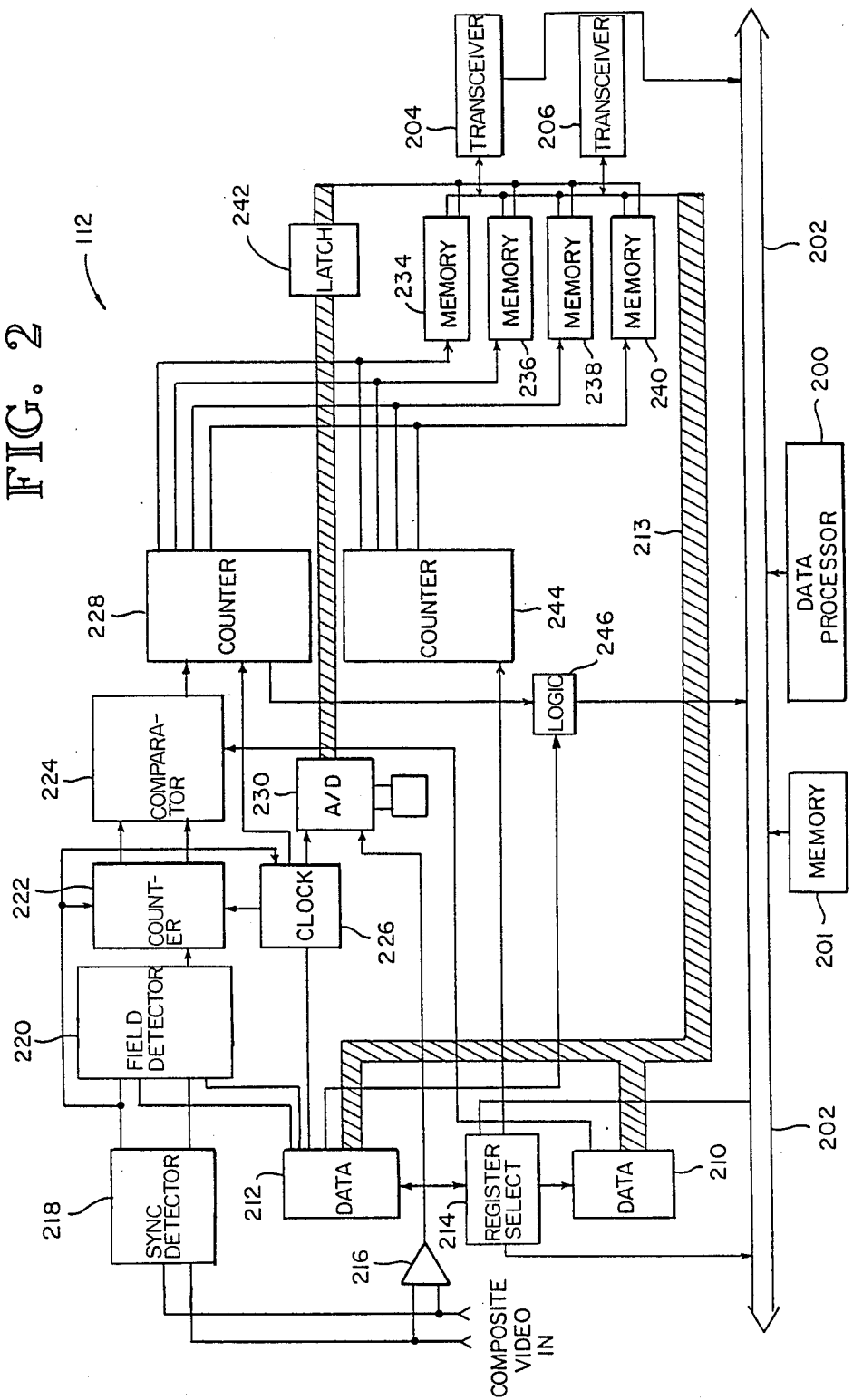
FIG. 2 is an illustrative block diagram of the digitizer apparatus which is the subject of the present invention.

With reference to FIG. 2, a data processor 200 is coupled to a data bus 202 for controlling the operation of the digitizer apparatus and for storing the digitized image data in memory 201 of the personal computer 100. The data processor 200 and the data bus may comprise a portion of the personal computer 100, as discussed above. The display 108 and the keyboard 110 are not illustrated in FIG. 2, however, it will be understood by those skilled in the art that the display and the keyboard may be coupled to the data bus 202 for communicating with the data processor 200.

The elements which are illustrated above the data bus 202 comprise the digitizer board 112 which is the subject of the present invention. The data processor 200 is coupled to first and second transceivers 204 and 206, via the data bus 202, for transferring digital data to the digitizer board and for receiving digital data from the digitizer board. The transceivers 204 and 206 are connected to data register 210 and 212, via an internal data bus 213. The data registers are provided for storing control data received from the data processor 200. The transceivers 204 and 206 as well as data registers 210 and 212 may be readily provided as off the shelf components to perform the functions as described herein.

A register select circuit 214 is coupled to the data bus 202 for receiving an address from the data processor 200. The address received instructs the register select circuit where to store the particular data which is being provided to the data registers by the internal bus 210. The register select circuit 214 enables the proper register to accept the control data such that the data may be later accessed as desired.

The composite video signal 298 from the camera 102 is received by an amplifier 216 and a composite synchronization detector 218. The amplifier 216 is provided for amplifying the composite synchronization signals to levels which will be acceptable by the digitizer board as will be described more fully below.

The composite synchronization detector 218 is provided for extracting a composite synchronization signal 301 from the composite video signal 298. The composite synchronization signal 301 is shown in graph (b) of FIG. 3 and includes the horizontal synchronization signal pulses 302, the vertical synchronization signal pulse 304, and the equalization pulses 306. The composite synchronization detector also detects the vertical synchronization signal pulse (shown in graph (c) of FIG. 3) and provides both the vertical synchronization signal pulse 304 and the composite synchronization signal to a field detector 220.

The field detector 220 is responsive to a plurality of control signals which are stored in the register 212 by the data processor 200, via the transceivers 204 and 206 and the internal bus 213, for controlling the digitization of the incoming composite video signal. One of the control signals provided from the data register 212 is a start signal which indicates that the frame grabbing operation is to begin. The field detector site synchronization signal 301 and thereby determine the occurrence of a vertical synchronization signal pulse 304. The digitization of the incoming composite video signal is initiated by the field detector 220 after receipt of one of the vertical synchronization signal pulses.

The field detector 220 is also provided for distinguishing between an even and odd field when the frame grabber board 112 is receiving an interlaced composite video signal. In this regard, the field detector 220 receives a field control data signal which is stored in the data register 212. The field control signal comprises a digital data value which indicates whether an interlaced composite video signal is being received and, further, indicates whether an even or odd field is to be digitized. The field detector 220 is responsive to the field control signal to sample the composite synchronization signal 301 and determine when the desired field is being received. Upon receipt of the start signal, the proper field and the vertical synchronization signal, the field detector 220 initiates the digitization of the incoming composite video signal by providing a start grab signal 310 (graph (d) in FIG. 3) to a hold-off counter 222.

The hold-off counter 222 acts in combination with a comparator 224 to delay the digitization of data for an amount of time equal to the number of blank front lines and the horizontal front porch. As is known in the art, the image which is represented by the composite video signal 298 includes a blank border about the periphery thereof. The border is transmitted by transmitting a plurality of blank lines at beginning and end of each field of image signal portions and by transmitting a zero value front porch portion 308 of the image signal portion 300 at the beginning and end of each line of the image, i.e., before and after each horizontal synchronization signal pulse 302. Control data which represents the number of blank lines and the duration of the front porch are stored in the register 210 by the data processor 200.

The hold-off counter 222 is configured to receive the composite synchronization signal 301 from the composite synchronization detector 218 and to count the number of horizontal synchronization signal pulses 302 which occur after receipt of the start-grab signal 310 from the field detector 220. The comparator 224 compares the number of horizontal synchronization pulses which have been counted by the hold-off counter 222 to the control value representing the number of blank lines. When the appropriate number of blank lines have been counted, the holdoff counter begins to count clock pulses 312 received from a clock circuit 226. The comparator compares the number of clock pulses received to the control data which represents the duration of the front porch until the appropriate number of clock pulses have been received and, thereafter, provides an enable signal to begin digitization of the composite video signal.

The clock 226 is responsive to the composite synchronization signal from the composite synchronization detector 218 to periodically generate a plurality of clock pulses 312 (shown in graph (e) in FIG. 3) which are used to control the digitization of the analog image signal portions 300. More particularly, the clock 226 is enabled by each horizontal synchronization signal to generate a plurality of clock pulses such that the clock pulses occur at the same time for each analog image signal portion (i.e., for each line of the image) relative to the horizontal synchronization signal. The pulses which are provided are each of substantially uniform, predetermined pulse width. The duration of the pulse width can be selected by a user prior to installation of the digitizer board 112 as will be discussed below. The clock pulses from the clock 226 are provided to an analog-to-digital (A/D) converter 230 and to an address counter 228.

The A/D converter 230 is also coupled to receive the amplified composite video signal from the amplifier 216. Upon each occurrence of one of the clock pulses 312 from the clock 226, the A/D converter 230 converts the composite video signal 298 to a digital data value which represents the relative magnitude of voltage of the composite video signal. The A/D converter 230 is also coupled to receive two reference voltages from a reference voltage generator 232. The reference voltages provide maximum and minimum reference values to the A/D converter 230. As is known in the art, the A/D converter will divide the reference voltage range by its maximum digital output value to determine the voltage increment which represents a unit of its output.

The A/D converter of the presently preferred embodiment provides an eight bit output word and converts data at a rate of 25 MHz. Further, the amplifier 216 of the present invention is adapted to amplify the composite video signal 298 to a maximum of 2 volts peak-to-peak. The reference voltages which are provided by the generator 232 in the presently preferred embodiment are selectable by a user but must be within a voltage range of plus or minus 2 volts. Accordingly, a unit of the A/D converter output value represents approximately 8 milivolts. It will be appreciated by those skilled in the art that other arrangements of A/D converter 230 and reference voltage generator 232 are possible without departing from the scope of the present invention.

The counter 228 counts the clock pulses from the clock 226 to provide a plurality of sequential addresses, each associated with a respective digital data value from the A/D converter 230. The counter 228 actually comprises two counter portions, one for counting the number of digital values which have been provided in a line of data, referred to as pixels, and one for counting the number of lines which have been digitized. The line counter portion of counter 228 may be initialized to count to either 256 or 512 while the pixel counter portion of counter 228 may be initialized to count to either 512 or 1024. Hence, the analog image signal can be digitized to a screen of 256×1024 pixels or 512×512 pixels. The control signals which determine the count range of the counter 228 are provided to the data registers 210 and 212 by a user as described above.

The pixel counter portion of the counter 228 is also adapted to provide a pixel count reached control signal to the comparator 224. The pixel count reached signal indicates that the appropriate number of pixels have been counted in a particular line and is used to reset the comparator 224 and the hold-off counter 222 to delay digitization until after the front porch of the succeeding line (i.e., of the next image signal portion 300) is received as will be described below.

The addresses provided from the counter 228 are provided to a plurality of memory units 234-240. Each memory unit may comprise a plurality of random access memory (RAM) circuits for temporarily storing the digitized data values before they are transferred to the memory 201 of the personal computer 100 controlled by the data processor 200. The digitized data is provided to the memory units 234-240 from the A/D converter 230 via a plurality of high speed data latches 242. The data latches 242 are provided for temporarily storing the digitized data values from the A/D converter 230 before they are stored in the memory units 234-240.

The data latches 242 actually comprise four devices each associated with a respective one of the four memory units 234-240. The digitized data is read from the A/D converter 230 to the appropriate latch and then transferred to its respective memory unit. In this manner, the memory devices which comprise the memory units 234-240 need not be as fast as the A/D converter 230, and, accordingly may comprise devices which are less expensive than high speed memory. In the presently preferred embodiment, the memory units 234-240 comprise HM6287LP-70, 64K by 1 static random access memory which are available from the Hitachi Company.

The digitizer board 112 includes a second address counter 244 which provides addresses to the memory units 234-240 for reading data out of the memory units 234-240 for storage in the memory 201 of the personal computer 100. The data which is read out is transmitted to the memory 201 via the transceivers 204 and 206 and the data bus 202. The counter 244 is responsive to a control signal received from the register select circuit 214 to begin the data read-out. Other internal logic 246 is provided on the digitizer board for signaling the data processor 200, by providing an interrupt to the data bus 202, that the address counter 228 has filled the memory units 234-240 so that the read-out may begin. The internal logic 246 is responsive to a control signal stored in the data register 212 to provide the interrupt signal from the counter 228 to one of a plurality of interrupts which may be available on the data bus 202.

Figure 4:
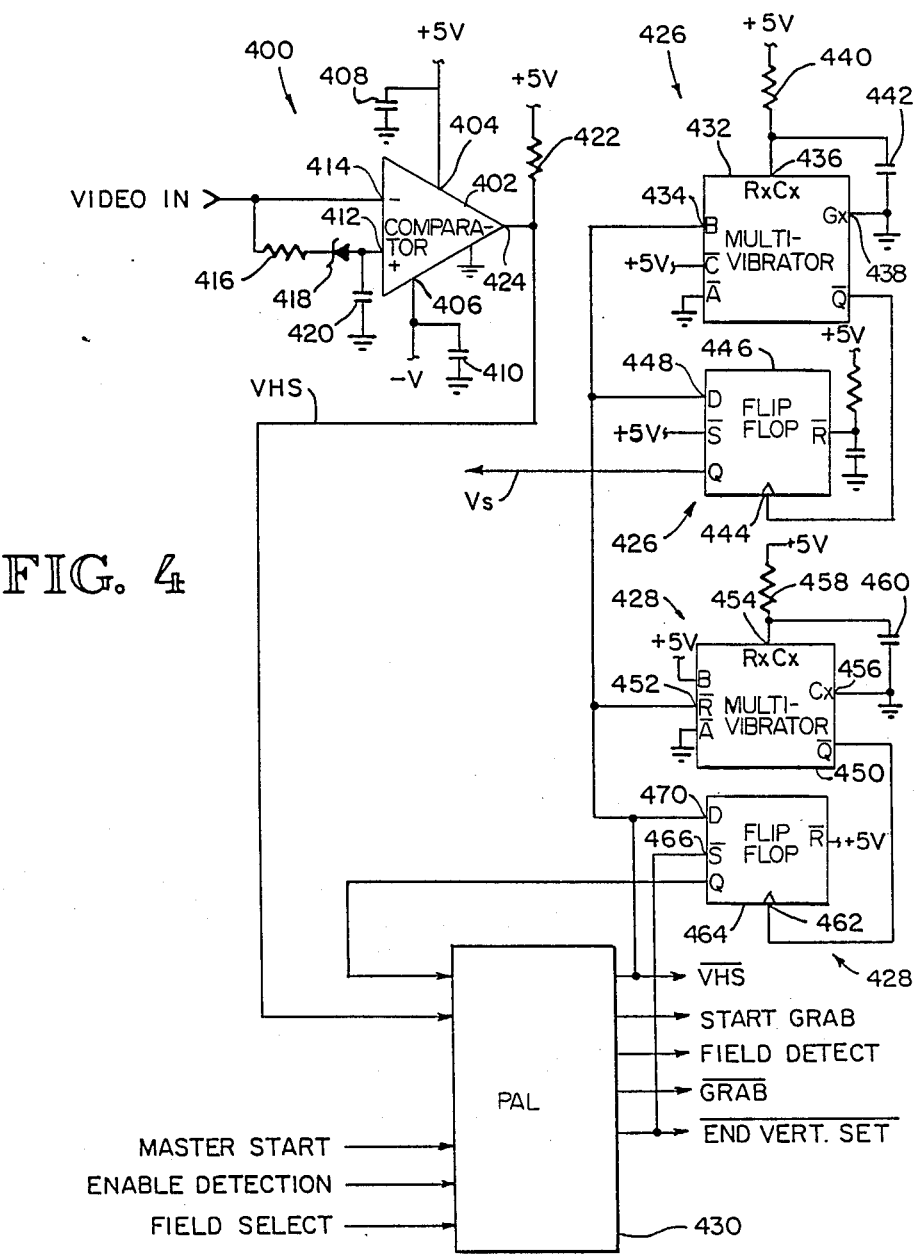
FIG. 4 is a more detailed illustrative block diagram of the composite synchronization detector and field detector illustrated generally in FIG. 2.

With reference to FIG. 4, a more detailed illustrative block diagram of the composite synchronization detector 218 and the field detector 220 is provided. The composite synchronization detector 218 comprises a comparator circuit 400 which includes a comparator 402. The comparator is coupled to receive positive and negative source voltages at its input terminals 404 and 406, respectively. Capacitors 408 and 410 are also coupled to the voltage sources to aid in providing charge for quick voltage changes. A pull-up resistor 422 is coupled between an output terminal 424 of the comparator 402 and the +5 volt source.

The comparator 402 includes a positive input terminal 412 and a negative input terminal 414 for receiving the voltage values which are to be compared. The comparator output terminal 424 is an open collector of a transistor and, accordingly, the output impedance of the comparator output terminal 424 will be at an extremely low value if the voltage at its positive input terminal 412 is greater than the voltage at its negative input terminal 414 such that the voltage at the comparator output terminal will be approximately zero volts. Conversely, the comparator output terminal impedance will be at an extremely high value if the value of the voltage at its negative input terminal 414 is greater that the voltage at its positive input terminal 412 such that the voltage at the comparator output terminal will be approximately +5 volts.

The negative input terminal 414 of the comparator 402 is coupled to receive the composite video signal 298 from the camera 102. The positive input terminal 412 is coupled to receive the composite video signal via a resistor 416 and a Schottky diode 418. Also, a capacitor 420 is coupled between the positive input terminal 412 and ground. The resistor 416, Schottky diode 418 and capacitor 420 are provided for preventing the voltage of the positive input terminal from quickly changing. As configured, the comparator circuit 400 operates like a negative peak detector as is known in the art.

The field detector 220 comprises two timing circuits 426 and 428 and a programmable array logic (PAL) 430. The PAL 430 may be purchased as an off the shelf device which comprises a plurality of various logic gates that may be programmed, i.e., interconnected, to provide various logic functions. The timing circuits 426 and 428 are provided for detecting predetermined time periods in the composite synchronization signal 301 which are intended to indicate a vertical synchronization signal and to distinguish between an even and odd field, respectively.

The timing circuit 426 comprises a monostable multivibrator circuit 432 which is coupled to receive the composite synchronization signal 301 at its B input terminal 434. The monostable multivibrator circuit 432 also includes timing input terminals 436 and 438 which are coupled to various points of a serial combination of a resistor 440 and a capacitor 442. As is known in the art, the monostable multivibrator circuit 432 responds to a positive transition of the signal at its B input terminal 434 to provide an output pulse which has a duration that is determined by the value of the resistor 440 and the capacitor 442. If a positive transition is received at the B input terminal 434 after the output pulse is begun, and before the output pulse is completed, the output pulse will restart such that its duration will be its predetermined value measured from the last received negative transition at the B input terminal 434.

The output from the monostable multivibrator circuit 432 is coupled to a clock input 444 of a data flip flop 446. The data input 448 of the flip flop 446 is coupled to receive the composite synchronization signal 301 from the comparator output terminal 424. The duration of the monostable multivibrator circuit 432 output pulse is chosen to be greater than the typical duration of a horizontal synchronization signal pulse 302 such that, if a vertical synchronization signal pulse 304 is received, then the value of the composite synchronization signal will be at a low value when the monostable multivibrator output pulse ends. The flip flop 446 will toggle the low value thereby indicating receipt of a vertical synchronization signal pulse.

Alternatively, if a horizontal synchronization signal pulse 302 is received then the value of the composite synchronization signal 301 will be at a high value when the monostable multivibrator output pulse ends and the flip flop 446 will not toggle a low value. It is noted that the equalization pulses 306 are always delayed from the negative transition of the vertical synchronization signal pulse 304 for a period of time which is greater than the duration of a horizontal synchronization signal pulse such that a vertical synchronization signal pulse can be detected. It is further noted that the equalization pulses are of a duration which is shorter than the duration of a horizontal synchronization signal pulse such that the output pulse of the monostable multivibrator is constantly restarted when equalization pulses are being received.

Figure 5:
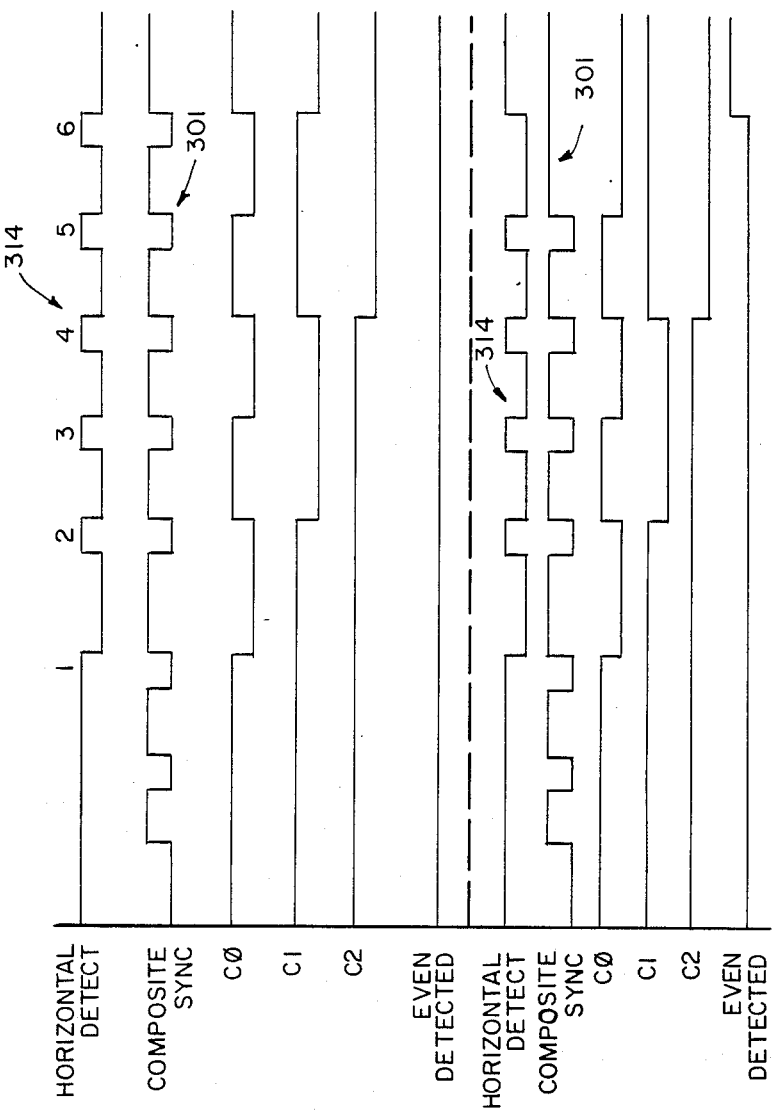
FIG. 5 is a timing diagram illustrating the relationship between several signals of the field detector illustrated in FIG. 4.

The timing circuit 428 operates in conjunction with the PAL 430 to determine whether an even or an odd field is being received by the digitizer board 112. The timing circuit 428 also includes a monostable multivibrator circuit 450 which is coupled to receive the composite synchronization signal at its inverted reset input 452. Timing inputs 454 and 456 are coupled to various points of a serial combination of a resistor 458 and a capacitor 460. The output of the monostable multivibrator circuit 450 comprises a horizontal detect signal 314 (illustrated in FIG. 5) which is coupled to the clock input 462 of a data flip flop 464. The inverted SET input 466 of the flip flop 464 is coupled to receive an inverted end vertical set signal from the PAL 430 and the data input 470 of the flip flop 464 is coupled to receive the inverted composite synchronization signal from the PAL 430. The output of the data flip flop 464 is couped to the PAL 430.

To indicate whether an even or odd field of interlaced video is being transmitted, video cameras typically transmit a variable number of equalization pulses 306: five pulses are transmitted if the field following the equalization pulses is an even field and six pulses are transmitted if the field following the equalization pulses is an odd field. The PAL 430 is programmed to count the number of equalization pulses as indicated by the signals labeled C0, C1 and C2 in FIG. 5. When C0 equals a logic zero, C1 equals a logic one and C2 equals a logic zero, then five pulses have been counted. The PAL 430 then samples the output of the flip flop 464 to determine whether the sixth pulse is received within the prescribed period of time.

The timing resistor 458 and capacitor 460 of the monostable multivibrator circuit 450 are chosen to provide an output pulse which has a duration that is slightly greater than the duration which occurs between successive equalization pulses 306. The monostable multivibrator circuit 450 is reset on the negative transition of the composite synchronization signal 301. As is known in the art, resetting the monostable multivibrator circuit 450 will return its inverted output, i.e., the horizontal detect signal 314, to a logic one and reset the monostable multivibrator circuit to provide another output pulse. The flip flop 464 is clocked on the positive transition of the horizontal synchronization signal pulse 302 from the monostable multivibrator circuit 450.

Hence, during receipt of the first five equalization pulses 306, the composite synchronization signal 301 constantly resets the monostable multivibrator circuit 450 such that the flip flop 464 samples its data input 470 when the composite synchronization signal is at a low value and the value of the flip flop output stays low. If a sixth pulse is received, as shown in graph A of FIG. 5, then the monostable multivibrator circuit 450 is again reset and the output of the flip flop 464 does not change such that the PAL 430 does not detect an even field. If, however, a sixth pulse is not received, as shown in graph B of FIG. 5, then the monostable multivibrator circuit is not reset and its output undergoes a positive transition when the composite synchronization signal 301 is at a high value such that the flip flop output transitions to a high value and the PAL 430 detects an even field.

In addition to detecting an even field when interlaced video is being received, the PAL 430 also receives other synchronization signals and control data from the data register 22, to perform other functions of the field detector, as described above. The programming of the PAL 430 may be readily performed by those skilled in the art by reading the present detailed description of the invention in conjunction with the drawings.

Figure 6:
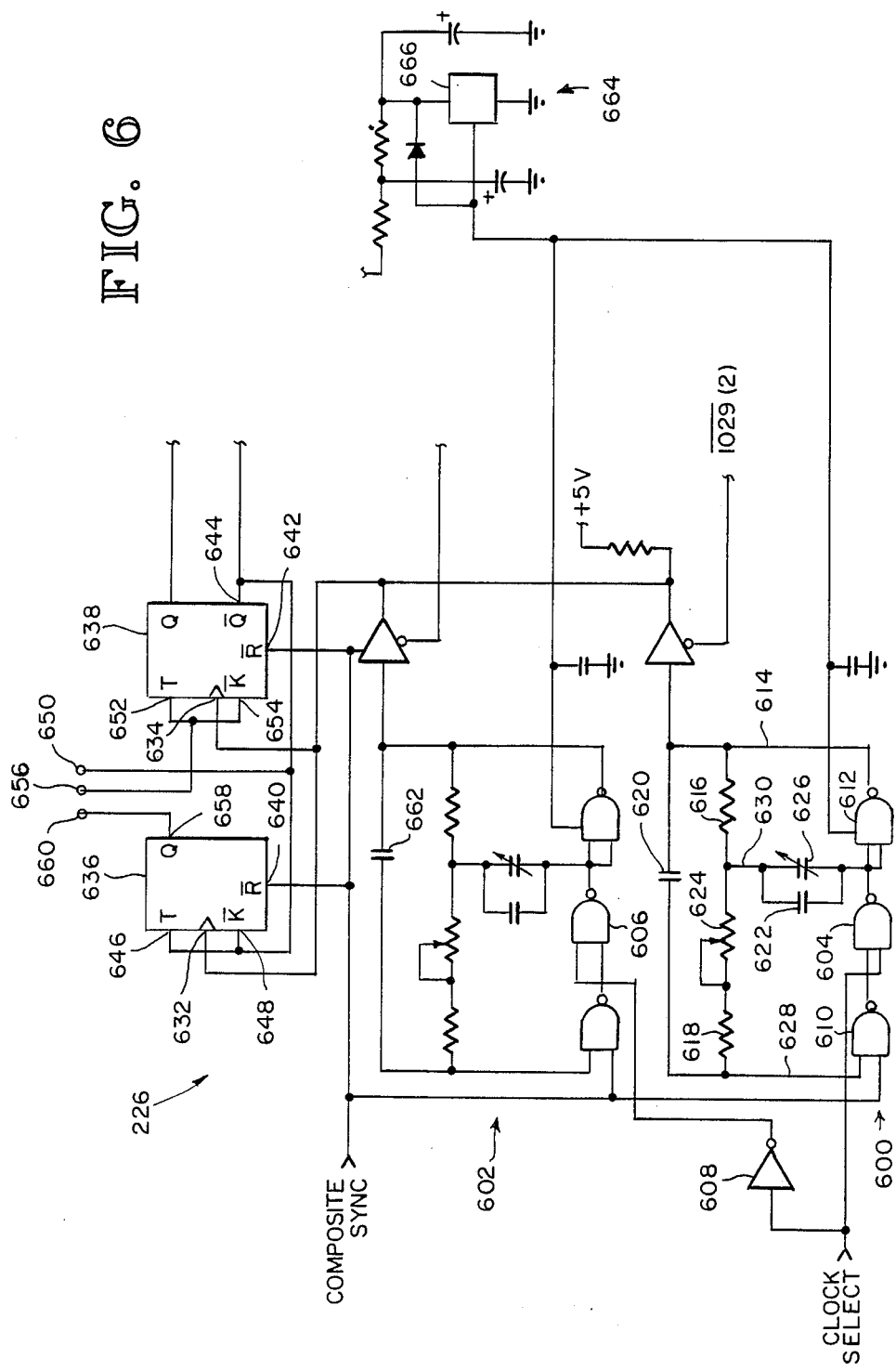
FIG. 6 is a more detailed illustrative block diagram of the clock illustrated in FIG. 2.

With reference to FIG. 6, a more detailed block diagram of the clock 226 illustrated in FIG. 2 is provided. The clock of FIG. 2 actually includes two identical clock circuits shown generally as a first clock 600 and a second clock 602. Since the operation of the first and second clocks 600 and 602 is identical, only the first clock 600 will be described in detail here. It will be appreciated by those skilled in the art, however, that the operation of the clock 602 is substantially identical to the operation of the clock 600.

A user of the digitizer board 112 is able to select between the two clocks by providing proper control data, i.e., a clock select signal, to the data register 212. The clock 226 is responsive to the clock select signal to enable one of the identical clock circuits 600 or 602. As shown in FIG. 6, the clock select signal is provided to a NAND gate 604 of the first clock 600. The clock select signal is provided to a NAND gate 606 of the second clock 602 after being inverted by an inverter 608. Accordingly, only one of the two clocks is selected for any digitizing operation.

The operation of the clocks 600 and 602 will be described by reference to the clock 600 making the assumption that the clock select signal is in the proper state to select this clock. The clock 600 is responsive to the composite synchronization signal 301 to begin generating the clock pulses. The composite synchronization signal is provided to a NAND gate 610 along with a feedback signal as will be described below. If the composite synchronization signal is at a low value, see FIG. 3, the output of the NAND gate 610 will be a logic one independent of the feedback input. Since the first clock 600 has been selected, the two inputs to the NAND gate 604 will be a logic one and the output of the NAND gate 604 will be a logic zero. The output of the NAND gate 604 is provided to both inputs of a NAND gate 612 whose output will be a logic one when the output of the NAND gate 604 is a logic zero.

The output node 614 of the NAND gate 612 is coupled to a resistor capacitor network consisting of two resistors 616 and 618, two capacitors 620 and 622, a variable resistor 624 and a variable capacitor 626. The output node 628 of the resistor capacitor network is coupled as the feedback input to the NAND gate 610.

When the composite synchronization signal 301 is at a low value, the output of the NAND gate 604 is a logic zero and the output of the NAND gate 612, i.e., node 614 will be a logic one. Since the input impedance to the logic gates is extremely high, and since capacitors do not conduct current in the steady state, no current will flow between the nodes 614 and 628 in the steady state and node 628 will be charged to a logic one. Similarly, the parallel capacitor combination 622 and 626 will be charged to a logic one, maintaining the voltage difference between a logic one and a logic zero between a node 630 and the output of the NAND gate 604. The capacitor 620 will not be charged at all.

When the composite synchronization signal 301 transitions to a logic one, the output of the NAND gate 610 transitions from a logic one to a logic zero. Similarly, the output of the NAND gate 604 transitions from a logic zero to a logic one and the output of the NAND gate 612 transitions from a logic one 1 o a logic zero. Since the output impedance of the NAND gate 612 is extremely low, the node 614 will be at substantially ground potential. The capacitor combination 622 and 626 will begin to discharge through the resistors 616, 618 and 624. The capacitor 620 will resist the flow of current from the node 628 while the grounded node 614 will tend to deplete the charge from the node 628. As a result, the node 628 will begin to transition from a logic one toward a logic zero at a rate which will be determined by the choice of resistors and capacitors in the resistor capacitor network.

When the voltage at the node 628 is low enough to be recognized as a logic zero by the NAND gate 610, the output of the NAND gate 610 will transition from a logic zero to a logic one, the output of the NAND gate 604 will transition from a logic one to a logic zero and the output of the NAND gate 612 will transition from a logic zero to a logic one. The capacitor 620 will resist the addition of charge to the node 628 while the logic one at the node 614 will urge the node 628 toward a logic one. The node 628 and the capacitor combination 622 and 626 will again charge toward a logic one. When the voltage at the node 628 is again recognized as a logic one, the NAND gates begin to transition and the capacitors begin to discharge as described above. Hence, while the composite synchronization signal 301 is at a logic one, the output node 614 of the clock 600 oscillates between logic one and zero to generate a plurality of clock pulses.

When the composite synchronization signal 301 transitions to a low value, the output of the NAND gate 610 will be a logic one, the output of the NAND gate 604 will be a logic zero, the output of the NAND gate 612 will be a logic one, the capacitor combination 622 and 626 will charge to a logic one and the node 628 will be charged to a logic one. Accordingly, when the composite synchronization signal is a low value, the resistor capacitor network will maintain a steady state condition with its output node at a high value.

The variable resistor 624 and the variable capacitor 626 are provided to allow a user to adjust the clock circuit to provide clock pulses having a specific duration such that the plurality of clock pulses will have a specific frequency. In the presently preferred embodiment, the resistors 616, 618 and 624 are selected to be 10 ohms, 220 ohms and 500 ohms, respectively. The capacitors 620 and 622 are selected to be 15 picofarads and 8 picofarads, respectively. The variable capacitors 624 are selected to be variable between 5 and 25 picofarads. The capacitor 662 of the clock circuit 602 is chosen to be 22 picofarads such that the frequency range of its output pulses is different from that of the clock 600. The described part selection allows the clock outputs to be variable between 17 and 25 MHz.

The output of the clocks 600 and 602 are provided to the clock inputs 632 and 634 of two J-K flip flops 636 and 638, respectively. The composite synchronization signal 301 is coupled to the inverted reset inputs 640 and 642 of the flip flops 636 and 638, respectively. The inverted output 644 of the flip flop 638 is coupled to the J input 646 and the inverted K input 648 of the flip flop 636 and is also coupled to an external connector 650. The J input 652 and the inverted K input 654 of the flip flop 638 are coupled to an external connector 656. The noninverted output 658 of the flip flop 636 is coupled to an external connector 660.

The flip flops 636 and 638 are provided for dividing the output of the clocks 600 and 602 by a factor of two or four. The user can select which factor is to be used prior to installation of the digtizer board 112 in the personal computer 100 by proper connection of the external connectors 650, 656 and 660. By connecting the connector 650 to the connector 656, the inverted output of the flip flop 638 is returned to the input of the flip flop 638 such that the output from the clocks 600 or 602 is divided by a factor of two. By connecting the connector 656 to the connector 660, the flip flops 636 and 638 are cascaded such that the output of the clock 600 or 602 is divided by a factor of four.

The clocks 600 and 602 are also provided with a dedicated voltage regulator circuit 664 which includes a voltage regulator 666. The voltage regulator circuit is provided for providing a source voltage to the NAND gates, drivers and flip flops of the clock circuit, which source voltage is substantially free from 60 Hz harmonics that are typically present and which can result in sampling times that do not occur at substantially the same time, from line-to-line, relative to the horizontal synchronizaton signal.

Figure 7:
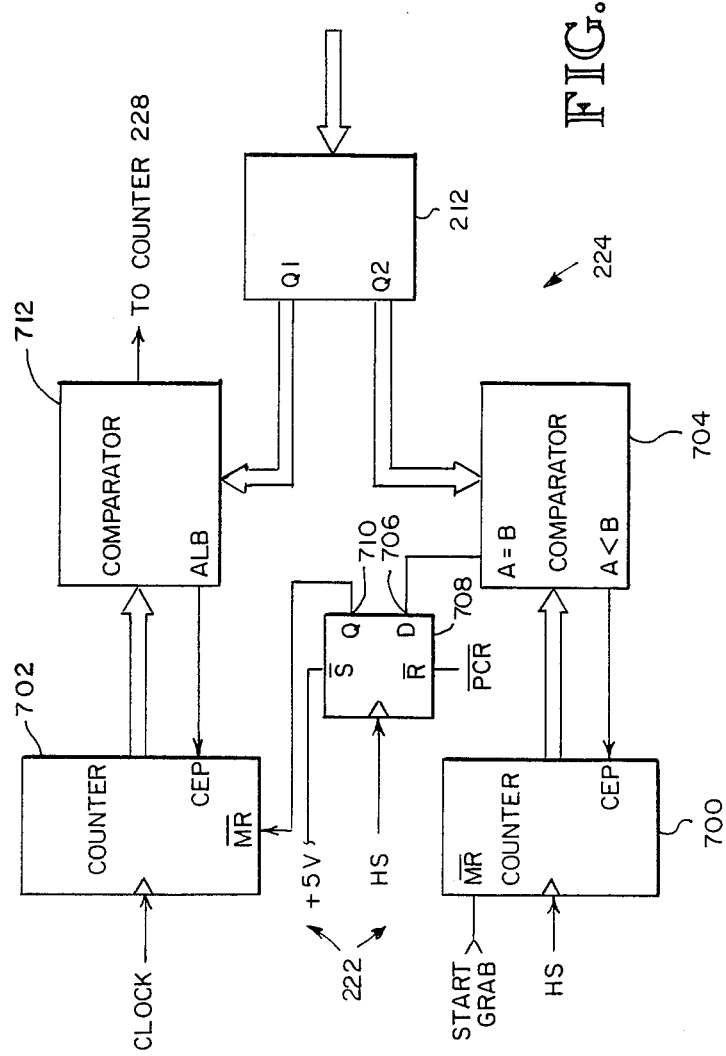
FIG. 7 is a more detailed illustrative block diagram of the hold-off counter and comparator illustrated in FIG. 2.

With reference to FIG. 7, a more detailed illustrative block diagram of the hold-off counter 222 and the comparator 224 of FIG. 2 is provided. The hold-off counter 222 actually comprises two counters 700 and 702. The counter 700 is coupled to count horizontal synchronization signal pulses 302 after receiving the start grab signal 310 from the field detector 220. The number of horizontal synchronization signal pulses which have been counted are compared by a comparator 704 to control data which is stored in the data register 212. When the number of horizontal synchronization signal pulses which have been counted equals the control data value to which it is compared, then the appropriate number of lines have been counted (skipped) and the data input 706 of a data flip flop 708 transitions to a logic one. Concurrently, the counter 700 is disabled by the A<B output of the comparator 704.

Upon the next occurrence of the horizontal synchronization signal pulse 302, indicating the first line of analog image signals is to follow, the non-inverted output 710 of the flip flop 708 transitions to a logic one enabling the counter 702. The counter 702 then counts clock pulses until the number of clock pulses counted equals the appropriate control data value stored in the register 212, as determined by a comparator 712. It is noted that the control data value which is stored in the register 212 by the data processor 200 must be calculated knowing the duration of the front porch and the duration of a single clock pulse.

When the comparator 712 reaches equality of its inputs, it provides the enable signal to the counter 228 as described above. The A<B output of the comparator 712 clears the counter 702 to again count another front porch. The inverted PCR (pixel count reached) control signal from counter 228 resets the flip flop 708 such that upon the next occurrence of the horizontal synchronization signal 302, the counter 702 will again count the number of, clock pulses to delay the digitization operation until after the front porch is received.

It will be appreciated that, although specific embodiments of the invention have been described herein for purposes of illustration, various modifications may be made without departing from the spirit and scope of the invention. Accordingly, the invention is not limited except as by the appended claims.

We claim:

1. Apparatus for digitizing a composite video signal of the type which includes an analog image signal that carries information for reproducing an image on a cathode ray tube, a plurality of equalization pluses for initializing a field of the image to be reproduced, a vertical synchronization signal which indicates the beginning and end of the field of the image and a horizontal synchronization signal which indicates the beginning and end of a line of the image, said apparatus comprising:

data processing means for processing digital data, said data processing means including a data bus;

data registers coupleable to the data bus of said data processing means for storing control data, said control data including a field select signal for indicating which field of an interlaced video signal is to be digitized, a clock select signal, a matrix size signal indicating the size of the data matrix to be generated, a blank lines value indicating the number of lines of a field which are to be skipped before the image signal is to be digitized and a horizontal front porch value indicating the number of clock pulses which must be counted before a line of data is to be digitized;

comparator circuit means for removing the analog image signal from the composite video signal to provide a composite synchronization signal, said comparator circuit means including a comparator having an output terminal and first and second input terminals and providing a first voltage value at its output terminal if the voltage at its first input terminal is greater than the voltage at its second input terminal and for providing a second voltage value at its output terminal if the voltage at its second input terminal is greater than the voltage at its first input terminal, said first input terminal being coupled to receive the composite video signal, said comparator circuit means further including a capacitor connected intermediate said second input terminal and ground potential, a Zener diode having its anode coupled to said second input terminal and its cathode coupled to receive the composite video signal such that the output of the comparator provides the composite synchronization signal;

first timing means for extracting the vertical synchronization signal from the composite synchronization signal, said first timing means including a first monostable multivibrator circuit coupled to receive the composite synchronization signal and to provide in response thereto a vertical synchronization detect signal having a predetermined pulse width, a first flip-flop circuit including a clock input coupled to receive the vertical synchronization detect signal and a data input coupled to receive the composite synchronization signal such that the first flip-flop circuit output provides the vertical synchronization signal;

field detect means for counting the equalization pulses of the composite synchronization signal, said field detect means including a second monostable multivibrator circuit responsive to the equalization pulses for providing a missing pulse detect signal having a predetermined pulse width, a second flip-flop circuit having a clock input coupled to receive the missing pulse detect signal and a data input coupled to receive the composite synchronization signal such that the second flip-flop circuit output provides an even field detected signal which indicates that the image signals which follow include information for reproducing an even field, said field detect means being responsive to the field select signal to determine whether the field which is to follow is desired, and, if so, providing a start-grab signal;

sample clock means for periodically generating a plurality of clock pulses, said sample clock means including a voltage regulator circuit for providing a substantially constant voltage value to first and second clock circuits, each of said first and second clock circuits including a resistor-capacitor timing circuit and being responsive the clock select signal and the horizontal synchronization signal for periodically generating a plurality of respective first and second clock pulses such that the plurality of clock pulses have a phase offset from the rising edge of the horizontal synchronization signal which is substantially constant and such that the plurality of clock pulses have a substantially constant, predetermined pulse width determined by the values of the resistors and capacitors;

delay means responsive to the start grab signal for counting horizontal synchronization signal pulses until the number of pulses counted equals the blank lines value stored in said data registers, and, thereafter, said delay means being responsive to each composite synchronization signal pulse for counting the number of clock pulses from said sample clock means until the number of clock pulses counted equals the horizontal front porch value and, thereafter, providing an enable signal;

analog to digital (A/D) converter means responsive to said clock means for converting the analog image signal to digital data values;

latch means for storing the digital output from said A/D converter means;

pixel memory means for storing the output from said latch means;

pixel address counter means responsive to the enable signal from said delay means for counting the number of pixels which have been digitized and providing a corresponding address to said memory, said pixel address means being further responsive to the matrix size signal for providing a pixel count reached signal to said delay means, said delay means being responsive to the pixel count reached signal for again counting clock pulses until the number of clock pulses counted equals the horizontal front porch value and, thereafter, again providing the enable signal; and transceiver means coupleable to the data bus of said data processing means for transferring the digital values stored in said memory to said data processor means and for receiving the control data from said data processing means such that said control data may be stored in said data registers.

2. Apparatus for digitizing a composite video signal of the type which includes an analog image signal that carries information for reproducing an image on a cathode ray tube, a plurality of equalization pluses for initializing a field of the image to be reproduced, a vertical synchronization signal which indicates the beginning and end of the field of the image and a horizontal synchronization signal which indicates the beginning and end of a line of the image, said apparatus comprising:

data processing means for processing digital data, said data processing means including a data bus, display means for interfacing with a user, input means for receiving information from the user and processor memory means for storing data;

data registers coupleable to the data bus of said data processing means for storing control data, said control data including a field select signal for indicating which field of an interlaced video signal is to be digitized, a clock select signal, a matrix size signal indicating the size of the data matrix to be generated, a blank lines value indicating the number of lines of a field which are to be skipped before the image signal is to be digitized and a horizontal front porch value indicating the number of clock pulses which must be counted before a line of data is to be digitized;

comparator circuit means for removing the analog image signal from the composite video signal to provide a composite synchronization signal, said comparator circuit means including a comparator having an output terminal and first and second input terminals and providing a first voltage value at its output terminal if the voltage at its first input terminal is greater than the voltage at its second input terminal and for providing a second voltage value at its output terminal if the voltage at its second input terminal is greater than the voltage at its first input terminal, said first input terminal being coupled to receive the composite video signal, said comparator circuit means further including a capacitor connected intermediate said second input terminal and ground potential, a Zener diode having its anode coupled to said second input terminal and its cathode coupled to receive the composite video signal such that the output of the comparator provides the composite synchronization signal;

first timing means for extracting the vertical synchronization signal from the composite synchronization signal, said first timing means including a monostable multivibrator circuit coupled to receive the composite synchronization signal and to provide in response thereto a vertical synchronization detect signal having a predetermined pulse width, a flip-flop circuit including a clock input coupled to receive the vertical synchronization detect signal and a data input coupled to receive the composite synchronization signal such that the flip-flop circuit output provides the vertical synchronization signal;

sample clock means for periodically generating a plurality of clock pulses, said sample clock means including a voltage regulator circuit for providing a substantially constant voltage value to first and second clock circuits, each of said first and second clock circuits including a resistor-capacitor timing circuit and being responsive the clock select signal and the horizontal synchronization signal for periodically generating a plurality of respective first and second clock pulses such that the plurality of clock pulses have a phase offset from the rising edge of the horizontal synchronization signal which is substantially constant and such that the plurality of clock pulses have a substantially constant, predetermined pulse width determined by the values of the resistors and capacitors;

delay means for counting horizontal synchronization signal pulses until the number of pulses counted equals the blank lines value stored in said data registers, and, thereafter, said delay means being responsive to each composite synchronization signal pulse for counting the number of clock pulses from said sample clock means until the number of clock pulses counted equals the horizontal front porch value and, thereafter, providing an enable signal;

analog to digital (A/D) converter means responsive to said clock means for converting the analog image signal to digital data values;

latch means for storing the digital output from said A/D converter means;

pixel memory means for storing the output from said latch means;

pixel address counter means responsive to the enable signal from said delay means for counting the number of pixels which have been digitized and providing a corresponding address to said memory, said pixel address means being further responsive to the matrix size signal for providing a pixel count reached signal to said delay means, said delay means being responsive to the pixel count reached signal for again counting clock pulses until the number of clock pulses counted equals the horizontal front porch value and, thereafter, providing again providing the enable signal; and transceiver means coupleable to the data bus of said data processing means for transferring the digital values stored in said memory to said data processor means and for receiving the control data from said data processing means such that said control data may be stored in said data registers.

3. Apparatus coupleable to a standard personal computer for digitizing a composite video signal of the type which includes an analog image signal that carries information for reproducing an image on a cathode ray tube and a composite synchronization signal which carries a horizontal synchronization signal and a vertical synchronization signal for synchronizing the video signal receiver and for controlling the decoding of the image signals to produce the image, said apparatus comprising:

interface means for interfacing said apparatus with the standard personal computer, said interface means including means for receiving control data from the standard personal computer and for transmitting digital data values to the personal computer;

control means for controlling the digitization of the composite video signal, said control means including means for extracting the composite synchronization signal from the composite video signal, said control means being responsive to the control data for initiating the digitization of the composite video signal;

sample clock means for periodically providing a plurality of clock pulses wherein each clock pulse has a substantially constant, predetermined duration, said sample clock means being responsive to the composite synchronization signal to start generating the clock pulses; and data converter means responsive to the clock pulse provided by said sample clock means for converting the analog image signals to digital data values, said converter means being coupled to said interface means for transferring the digital data values thereto.

4. Apparatus as recited in claim 3 wherein said sample clock means comprises:

a resistor and capacitor (RC) network having a determinable RC time constant, an input terminal for receiving input voltages and a sampling terminal for providing output voltages; and digital gate means for controlling the operation of said RC network, said digital gate means being responsive to a first value of the composite synchronization signal for supplying a first voltage value to the input terminal of said RC network, said digital gate means being responsive to a second value of the composite synchronization signal to alternately charge and discharge said RC network by providing respective high and low values to said input terminal, said RC network being charged when the voltage of said sampling terminal is a first value and said RC network being discharged when the voltage of said sampling terminal is a second value whereby said input terminal of said RC network provides the clock output.

5. Apparatus as recited in claim 4 wherein said sample clock means further comprises a voltage regulator circuit for providing a supply voltage to the digital gate means which is substantially free of noise and alternating current components.

6. Apparatus as recited in claim 4 wherein said RC network includes at least one variable resistor and at least one variable capacitor such that the time constant of said RC network may be adjusted by a user.

7. Apparatus as recited in claim 4 wherein said sample clock means includes means for dividing the number of clock pulses provided by said sample clock means by a predetermined divisor.

8. Apparatus as recited in claim 3 wherein said means for extracting the composite synchronization signal from the composite video signal comprises:

a comparator having first and second inputs and being adapted to provide an output having a first voltage value when the voltage at the first input is greater than the voltage at its second input and to provide an output having a second voltage value when the voltage at the second input is greater than the voltage at the first input, said first input being coupled to receive the composite video signal; and switched storage means for periodically storing charge supplied by the composite video signal, said switched storage means being coupled to the composite video signal to receive and store charge at times when the voltage of the composite video signal is changing slowly and being decoupled from the composite video signal to retain stored charge at times when the voltage of the composite video signal is changing rapidly, said switched storage means including a storage output terminal which provides an output voltage indicative of the stored charge, said storage output terminal being coupled to said second input terminal of said comparator.

9. Apparatus as recited in claim 8 wherein said switched storage means comprises a capacitor connected said storage output terminal and ground potential, a Zener diode having its anode coupled to said storage output terminal and its cathode coupled to receive the composite video signal such that the output of the comparator provides the composite synchronization signal.

10. Apparatus as recited in claim 3 wherein said control means comprises field detect means for determining whether the composite video signal being received includes an even field of image information.

11. Apparatus as recited in claim 10 wherein said field detect means comprises:

a timing circuit for determining whether an equalization pulse is received within a predetermined time interval following each equalization pulse, and, if so, providing a detect signal; and logic means for counting a predetermined number of equalization pulses of the composite synchronization signal and, thereafter, sampling said detect signal to determine whether the composite video signal being received includes an even field of image information.

12. Apparatus as recited in claim 11 wherein said timing circuit comprises:

a monostable multivibrator circuit responsive to the equalization pulses of the composite synchronization signal to provide a missing pulse detect signal having a predetermined pulse width; and a flip-flop circuit having a clock input coupled to receive the missing pulse detect signal and a data input coupled to receive the composite synchronization signal such that the flip-flop circuit output provides the field detect signal.

13. Apparatus as recited in claim 10 wherein said field detect means is further responsive the control data received from the standard personal computer to determine whether the field which is to follow is desired, and, if so, to initiate the digitizing operation.

14. Apparatus as recited in claim 3 wherein said control means further comprises synchronization detect means for extracting the vertical synchronization signal from the composite synchronization signal.

15. Apparatus as recited in claim 14 wherein said synchronization detect means comprises:

a monostable multivibrator circuit coupled to receive the composite synchronization signal and to provide in response thereto a vertical synchronization detect signal having a predetermined pulse width; and a flip-flop circuit including a clock input coupled to receive the vertical synchronization detect signal and a data input coupled to receive the composite synchronization signal such that the flip-flop circuit output provides the vertical synchronization signal.

16. Apparatus as recited in claim 3 wherein said control means further comprises delay means for delaying the digitization of the image signal such that a frame portion of the image is not digitized.

17. Apparatus as recited in claim 16 wherein said delay means comprises:

counter means responsive to the vertical synchronization signal for counting vertical synchronization signal pulses wherein each vertical synchronization signal pulse represents a line of image information; and comparator means responsive to the control data to determine when the appropriate number of blank lines have been received, and, thereafter, enabling said counter means to count the number of clock pulses from said sample clock means, said comparator means being further responsive to said control data for determining when the appropriate number of clock pulses have been received, and, thereafter said delay means initiating the digitization.

* * * * *